United States Patent [19]
Bedi

[11] 3,831,213
[45] Aug. 27, 1974

[54] COMPOSITE SELF-LOCKING FASTENER
[76] Inventor: Ram D. Bedi, 3011 Pleasant Trl., Southfield, Mich. 48076
[22] Filed: Sept. 7, 1972
[21] Appl. No.: 287,206

Related U.S. Application Data
[63] Continuation of Ser. No. 121,644, March 8, 1971.

[52] U.S. Cl. .................. 10/10 P, 85/1 C, 151/14.5
[51] Int. Cl. ............................................. B23g 9/00
[58] Field of Search ............ 10/2, 10 R, 10 P; 29/196.1, 196.3; 85/1 C; 151/7, 14 R, 14.5

[56] References Cited
UNITED STATES PATENTS

| | | | |
|---|---|---|---|
| 1,552,040 | 9/1925 | Fowle et al. | 29/196.1 |
| 2,251,410 | 8/1941 | Koehring et al. | 29/196.3 |
| 2,321,414 | 6/1943 | Parker | 85/1 C |
| 2,718,647 | 9/1955 | Raible | 85/1 C |
| 2,939,805 | 6/1960 | Johnson | 151/14.5 |
| 3,294,139 | 12/1966 | Preziosi | 10/10 P |
| 3,400,010 | 9/1968 | Keating | 117/105 X |
| 3,552,467 | 1/1971 | Bergere | 151/14 R |
| 3,568,746 | 3/1971 | Faroni et al. | 151/7 |
| 3,579,684 | 5/1971 | Duffy | 10/10 P |

FOREIGN PATENTS OR APPLICATIONS

| | | | |
|---|---|---|---|
| 811,573 | 4/1959 | Great Britain | 85/1 C |
| 26,071 | 11/1913 | Great Britain | 151/14 R |

Primary Examiner—Charles W. Lanham
Assistant Examiner—E. M. Combs
Attorney, Agent, or Firm—Teagno & Toddy

[57] ABSTRACT

Self-locking fasteners, and methods of making same; for example, metal fasteners wherein the self-locking characteristic is derived from a composite patch comprising metals or metal alloys selectively bonded to the surface of the metal fastener by multiple molten spraying operations.

9 Claims, 4 Drawing Figures

PATENTED AUG 27 1974  3,831,213
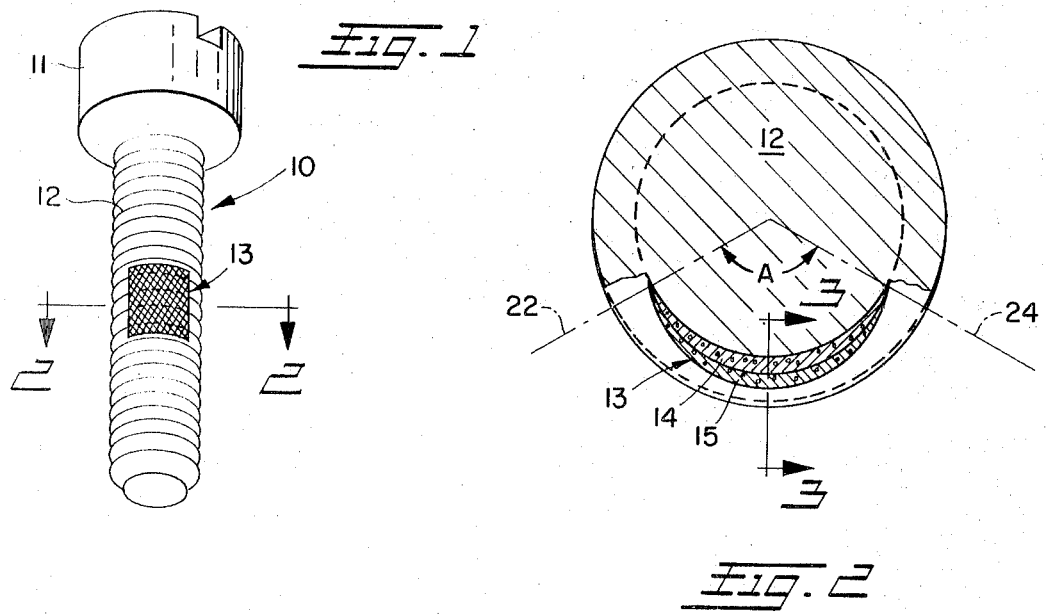
Fig. 1
Fig. 2
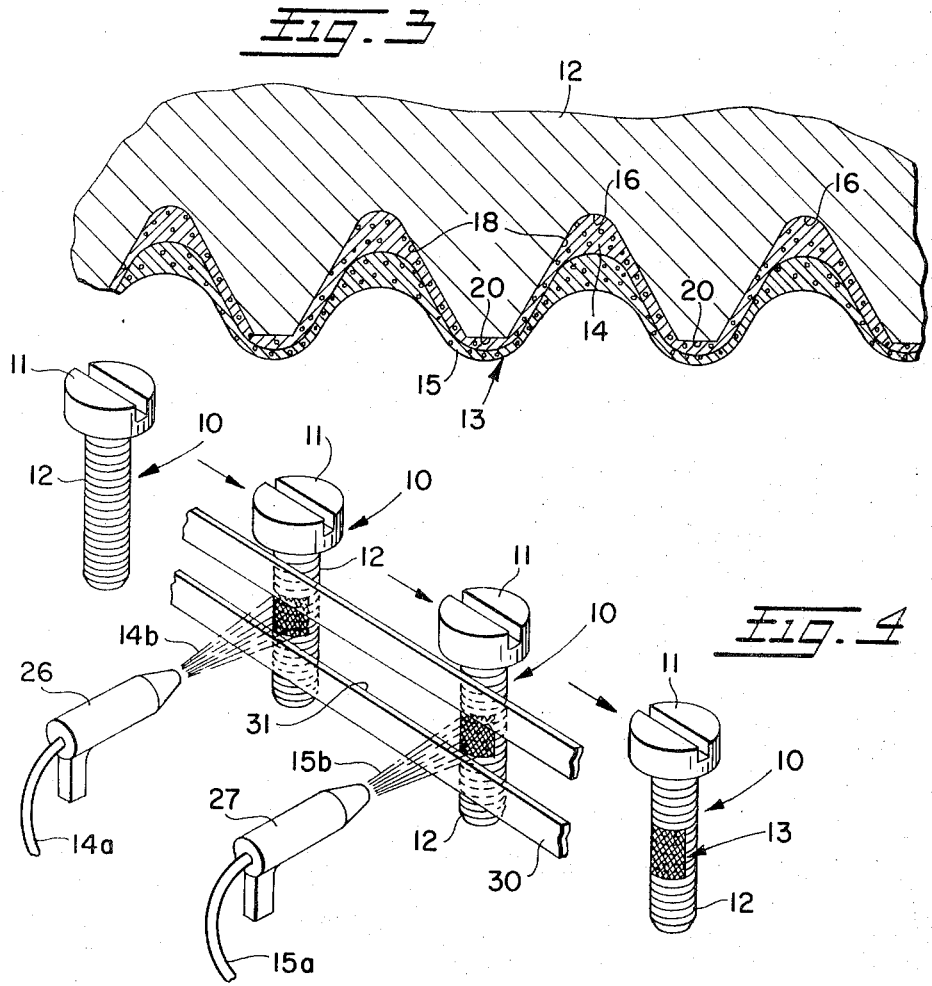
Fig. 3
Fig. 4

COMPOSITE SELF-LOCKING FASTENER

CROSS-REFERENCE TO RELATED APPLICATIONS

This application is a continuation-in-part of copending application U.S. Ser. No. 121,664 filed Mar. 8, 1971 entitled "Self-Locking Fastener."

BACKGROUND OF THE INVENTION

This disclosure relates to improvements in self-locking fasteners. In an earlier filed application entitled "Self-Locking Fastener" Ser. No. 121,664 filed Mar. 8, 1971, there is disclosed a metal, screw type self-locking fastener and a method of making the fastener. The self-locking characteristic is imparted by cleaning a part of the threaded portion of the fastener and thereafter spraying the cleaned portion with a molten metallic material in a manner which produces a relatively spongy, porous metallic patch. The self-locking fasteners disclosed in the earlier application are eminently satisfactory for most uses. It has, however, been discovered that the self-locking characteristics may be improved and the cost of such fasteners reduced.

BRIEF DESCRIPTION OF THE DISCLOSURE

According to a feature of the method, a self-locking characteristic is imparted to a threaded fastener by spraying at least a part of the threaded portion of the fastener with a first molten material to provide a lamina of the first material and thereafter spraying a second molten material, dissimilar to the first material, on the first lamina to produce a composite patch which includes an underlayer, adjacent the fastener, of the first material and an overlayer of the second material. The bonding of the composite patch to the fastener is improved for the reason that the first layer is chosen for its bonding qualities to the material of the fastener and the second layer is applied to the first layer at a time when the first layer is receptive to a good bond.

In the disclosed embodiment, the first layer of material is similar to the material of the threaded fastener, for example, steel, and the second layer of material is dissimilar, for example, brass. Both layers are applied to the threaded portion of the fastener in a molten particle form. The disclosure contemplates that the fasteners can be moved sequentially past a metal spray work station which employs two flame spray guns for applying first and second layers of metallic material respectively in rapid succession to the threaded surface of the fastener in a production line operation.

The disclosed self-locking threaded metal fastener comprises a composite metallic patch having a spongy, porous first layer of a first metallic material bonded to a portion of the threaded surface of the fastener and a spongy, porous second layer of a second metallic material, dissimilar to the first material, bonded to the first layer. The fastener may comprise a bolt having a threaded shaft portion formed of a suitable steel. The composite metallic patch is bonded to the shaft portion and may comprise an underlayer of a suitable steel and an overlayer of a suitable copper alloy. The composite metallic patch is unaffected by high temperatures and organic fluids and has improved reusability characteristics compared to synthetic, resin, and single layer metal patches.

BRIEF DESCRIPTION OF THE DRAWINGS

FIG. 1 is a perspective view of a self-locking metal fastener according to the disclosure.

FIG. 2 is a cross-sectional view taken on line 2—2 of FIG. 1.

FIG. 3 is an enlarged fragmentary view in longitudinal section taken on line 3—3 of FIG. 2 showing the distribution of laminar metallic patch materials along the threaded surface of the fastener.

FIG. 4 is a perspective view illustrating a multiple spraying operation for applying a composite metallic patch.

DETAILED DESCRIPTION OF THE PREFERRED EMBODIMENT

The disclosure will be described in relation to a method for imparting a self-locking characteristic to a threaded metal fastener, and in relation to a threaded metal fastener produced by the method.

A self-locking fastener is illustrated in FIG. 1 comprising a threaded bolt 10 of a standard form having a head portion 11, a threaded portion 12 and a composite metallic patch 13 provided on a selected area of threaded portion 12.

As illustrated in FIG. 2, the composite metallic patch 13 comprises an underlayer of metallic material 14 and an overlayer of metallic material 15, and covers the valleys 16, the inclined helical bearing surfaces 18 and the crests 20 of a part of threaded portion 12. Composite patch 13 is located relative to the length of threaded portion 12 so that it will be elastically deformed between the threaded portion 12 and mating threads of a complimentary element with which the bolt 10 is assembled to provide increased frictional resistance to undesired loosening of the threaded engagement between bolt 10 and the complimentary element. The material 14 of the underlayer is preferably similar to bolt 10. The material 15 of the overlayer is dissimilar to material 14 and has a lower modulus of elasticity than that of material 14.

As best seen in FIG. 2, the exposed surface of composite metallic patch 13 extends in a substantially continuous convex curve from one radial plane 22 to another radial plane 24. The included angle "A" between planes 22 and 24 is preferably greater than 90° and less than 180°. The radial thickness of patch 13 is greatest substantially midway between planes 22 and 24 and gradually diminishes as it approaches the limiting radial planes 22 and 24. The exposed surface of patch 13 preferably forms only a small angle to a tangent to the threaded surfaces at the limiting radial planes 22 and 24. The tapered configuration of patch 13 is important since it allows easy engagement of bolt 10 with a complimentary element while yet retaining superior resistance to undesired loosening of the resulting threaded engagement. Although patch 13 is shown to have a generally rectangular configuration in FIG. 1, it will be apparent that various other configurational patch shapes may be employed.

In accordance with the method aspects of the present disclosure, all or a selected portion of threaded portion 12 of fastener 10 is initially subjected to a cleaning solvent, such as, trichlorethylene or methyl ethyle ketone, to remove any soluble oils. Following cleaning of fastener 10, a first metallic material 14 is applied to the cleaned portion in a first spraying operation. The first metallic material 14 is preferably a metal or metal alloy similar to and which may have a modulus of elasticity substantially the same as that of the material of the threaded portion of the fastener. Satisfactory results have been obtained by applying a metallic material such as carbon steel on a carbon steel fastener.

A second metallic material 15 is thereafter applied to the first metallic material 14 in a second spraying operation to produce a composite metallic patch 13. The second metallic material that is illustrated is a metal or metal alloy having a modulus of elasticity lower than that of the first metallic material. The resulting patch comprises an underlayer, adjacent the fastener, of the first metallic material, e.g., steel, and an overlayer of the second metallic material, e.g., copper alloy. Satisfactory results have been attained by using materials such as molybdenum and copper alloys for the second metallic material in application where a complimentary, threaded, steel element is contemplated. It should be noted that the second material is chosen from a group of materials which have good lubricious properties when engaged with the material of the complimentary element and which also have good bonding properties with the first material. In the preferred embodiment the overlayer of the patch should be an elastic material which will deform upon contact with the complimentary threads. It is preferred to have the patch deform rather than the complimentary threads.

As illustrated in FIG. 4, the spraying operation includes two flame spray guns 26 and 27. Bolts 10 are successively moved past the guns 26 and 27 by a suitable conveyor facility (not shown) with their longitudinal axis disposed normal to the spray from the guns and the direction of movement of the bolts. Metallic material 14a and 15a is fed in wire form through spray guns 26 and 27, respectively, and is atomized by the guns to produce molten metallic sprays 14b and 15b. Spray guns 26 and 27 are positioned so that the molten metallic spray 15b is applied to bolt 10 immediately after the application of the molten metallic spray 14b. By so positioning the guns, the first material will be at a high temperature at the time the second material is applied. Application in this manner results in improved bonding between the materials 14 and 15. A mask 30 is positioned between bolts 10 and guns 26 and 27. Mask 30 includes a longitudinal central aperture 3 which functions to channel molten metallic sprays 14b and 15b onto the selected arcuate area on threaded portions 12 of bolts 10. A composite metallic patch 13 is thereby formed on the surface of threaded portion 12 with the arcuate and axial extent of the patch being selectively predetermined by the configuration of opening 3 and the positioning of guns 26 and 27 and bolt 10. The tapered configuration of patch 13 is produced in the disclosed method by virtue of the circular shape of the sprayed surface and the normal disposition of the bolt axis relative to the direction of the spray.

Flame spray guns suitable for carrying out the method are commercially available, for example, from the Colmonoy Division of the Wall Colmonoy Corporation of Detroit, Michigan. The Colmonoy Wirespray Gun WG-550 has been found to be particularly well suited to the method.

The fasteners may undergo one or more postspraying operations. For example, the fasteners may be sized to ensure any desired composite patch thickness or configuration. The fasteners may also be treated with a light coat of lubricating material such as molybdenum disulfide, SAE-30 oil or wax.

It is understood that the method can be a production line operation in which cleaning, metal spraying and post treating work stations are serially arranged in a given work area and fasteners are sequentially moved past the successive stations.

In order to further illustrate the method and fastener of the disclosure, the following example is provided.

EXAMPLE

A standard SAE-10-38 steel bolt was first cleaned with trichlorethylene to remove oils. Next, a Colmonoy Wirespray Gun WG-550 was used to apply a first metallic layer of steel to the threaded surface of the bolt. The steel was fed into the spray gun in wire form and exploded from the spray gun in a molten metallic particle spray which impinged upon the surface of the bolt forming a first layer of heterogeneous, spongy, porous metallic material bonded to the threaded surface. Immediately thereafter, in a similar manner, a second spray gun was used to apply a second metallic material of "Spraybronze C" over the first metallic layer to produce a composite metallic patch. "Spraybronze C" is copper alloy consisting of 90 percent copper and 10 percent zinc. The alloy is available from Metco Inc. of Westbury, New York.

The mask 30 was placed about 1 inch from the adjacent surface of the bolt's threaded portion 12. Spray guns 26 and 27 were held with their tips between 3 to 5 inches from mask 30. The bolt was sprayed with the steel for about 5 seconds, forming a heterogeneous metallic layer (FIG. 2) having a spongy, porous constitution by virtue of the spraying operation. Immediately thereafter the bolt was sprayed with the "Spraybronze C" for about 2 seconds, forming a second homogeneous spongy, porous metallic layer (FIG. 2).

It will be understood that although metal is referred to in the above example, the disclosure contemplates that composite metallic or nonmetallic patches can be formed on metallic or nonmetallic threaded fasteners. In instances where nonmetallic patches are contemplated, the words "liquid" and "molten" are used synonymously. Further, it is also possible to apply composite patches to nonferrous fasteners. For example, a threaded brass fastener intended for use with a brass nut could first be flame sprayed with molten brass and thereafter flame sprayed with molten steel. In use lubricity would exist between the brass nut and outer steel layer of the composite patch. Self locking would be created by deformation of the threads of the brass nut.

What is claimed is:

1. A method for producing a reusable, all metallic, self-locking fastener having an axially extending threaded portion for threaded engagement with a complementary threaded member and a metallic patch bonded to the threaded portion for self-locking interference with the complementary member comprising the steps of:

A. providing a metallic fastener having an axially threaded portion;

B. spraying a selected part of said threaded portion with a first molten metallic material to produce a deposit of said first metallic material; and C. spraying said first metallic material deposit with a second molten metallic material having a modulus of elasticity lower than that of said threaded portion and said complementary threaded member to produce a relatively spongy porous metallic patch having an effective locking area extending less than 360° of the circumference of the fastener and being thicker in the thread valleys than on the surrounding thread crests.

2. The method of claim 1 wherein said first metallic material has a modulus of elasticity similar to that of said threaded portion.

3. The method of claim 2 wherein the spraying of steps B and C is flame spraying.

4. The method of claim 3 wherein said spraying of step C produces a metallic patch having a generally elliptical cross-section taken along a plane perpendicular to the axis of the threaded portion.

5. The method of claim 2 wherein said patch has an effective circumferential extension of greater than 90° and less than 360°.

6. The method of claim 3 wherein said second metallic material is flame sprayed immediately after the flame spraying of said first metallic material and while said first material deposit is still at substantially the temperature at which it was deposited.

7. A method of producing a reusable, all metallic, self-locking fastener having an axially extending threaded portion for threaded engagement with a complementary threaded member and a metallic patch bonded to the threaded portion and extending radially therefrom for self-locking interference with the complementary member comprising the steps of:

A. providing a metallic fastener having an axially extending threaded portion;
B. flame spraying a selected part of said threaded portion with a first molten metallic material having a modulus of elasticity similar to that of said threaded portion; and
C. flame spraying said first metallic material deposit while still molten with sufficient second molten metallic material having a modulus of elasticity lower than that of said threaded portion and said complementary threaded member to produce a spongy porous patch having an effective locking area extending less than 360° of the circumference of the fastener and which is thicker in the thread valleys than on the adjacent thread crests.

8. A method for producing reusable, all metallic, self-locking fasteners each having axially extending threaded portions for threaded engagement with complementary threaded members and a metallic patch bonded to the threaded portion and extending radially therefrom for self-locking interference with the complementary threaded member comprising the steps of:

A. providing a plurality of all metallic fasteners having axially extending threaded portions;
B. providing a first, continuously spraying, flame spray gun for flame spraying a first molten metallic material;
C. providing a second, continuously spraying, flame spray gun for flame spraying a second molten metallic material having a modulus of elasticity lower than that of said threaded portion and said complementary threaded member;
D. axially and rotationally controlling the position of said metallic fasteners while simultaneously moving each of said fasteners sequentially into the spray of said first flame spray gun to produce a deposit of said threaded portions having an effective circumferential extension of less than 360° of the circumference of the fastener and then out of the spray of said first spray gun and immediately into the spray of said second flame spray gun to produce a spongy porous deposit of said second metallic material upon said deposit of said first metallic material, said deposits being substantially thicker in the thread valleys than on the adjacent crests.

9. The method of claim 8 additionally comprising the step of:

E. providing a mask for the sprays of the first and second flame spray guns to selectively limit the axial extent of said deposits of said first and second metallic material on said threaded portions.

* * * * *